(12) United States Patent
Peterson

(10) Patent No.: US 8,643,890 B1
(45) Date of Patent: Feb. 4, 2014

(54) CARD FORMAT FOR DIGITAL SCREEN AND PRINT DISPLAY

(76) Inventor: Richard Esty Peterson, San Francisco, CA (US)

( * ) Notice: Subject to any disclaimer, the term of this patent is extended or adjusted under 35 U.S.C. 154(b) by 854 days.

(21) Appl. No.: 12/660,604

(22) Filed: Mar. 1, 2010

Related U.S. Application Data

(60) Provisional application No. 61/209,165, filed on Mar. 4, 2009.

(51) Int. Cl.
*G06K 15/00* (2006.01)
*G06F 3/12* (2006.01)

(52) U.S. Cl.
USPC .......................... 358/1.18; 358/1.15; 358/1.13

(58) Field of Classification Search
None
See application file for complete search history.

(56) References Cited

U.S. PATENT DOCUMENTS

| 7,584,424 B2 * | 9/2009 | Hanechak | 715/244 |
| 2005/0113025 A1 * | 5/2005 | Akamatsu et al. | 455/41.3 |
| 2005/0234737 A1 * | 10/2005 | Lapstun et al. | 705/1 |
| 2006/0007490 A1 * | 1/2006 | Silverbrook et al. | 358/1.15 |

* cited by examiner

*Primary Examiner* — Dov Popovici

(57) ABSTRACT

A system for formatting and printing wallet cards having the form factor of a standard ISO credit card or debit card, the printing format being calculated according to the aspect ratio and pixel density of mobile handheld devices that are capable of communicating with a printer wherein the handheld device preferably has an internal program that converts the pixilated display screen to a select content portion of the physical ISO card area wherein the remaining card area resulting from the mismatch of the aspect ratios of the display screen and the physical card form is programmed to contain data, graphics, coding, or if desired, left blank as part of the card margin.

3 Claims, 4 Drawing Sheets

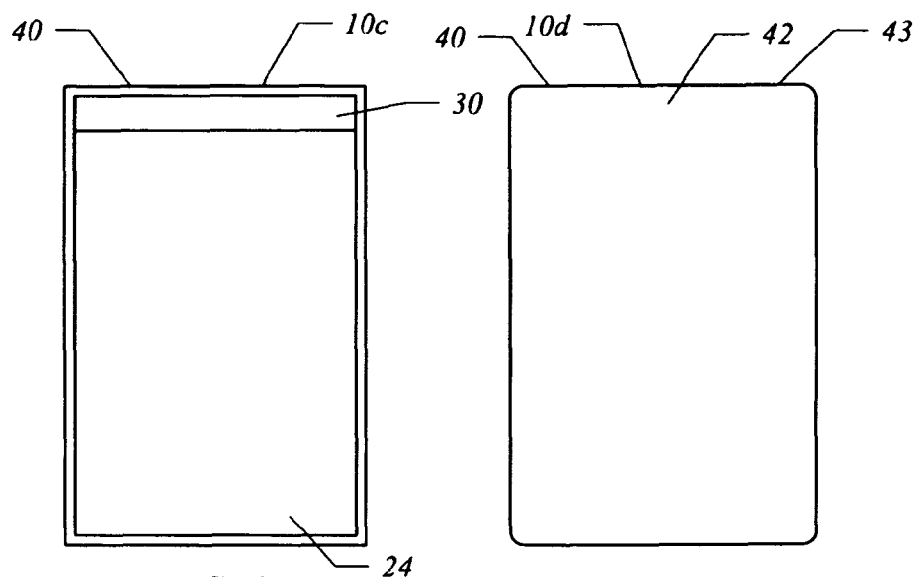
*FIG. 3*  *FIG. 4*
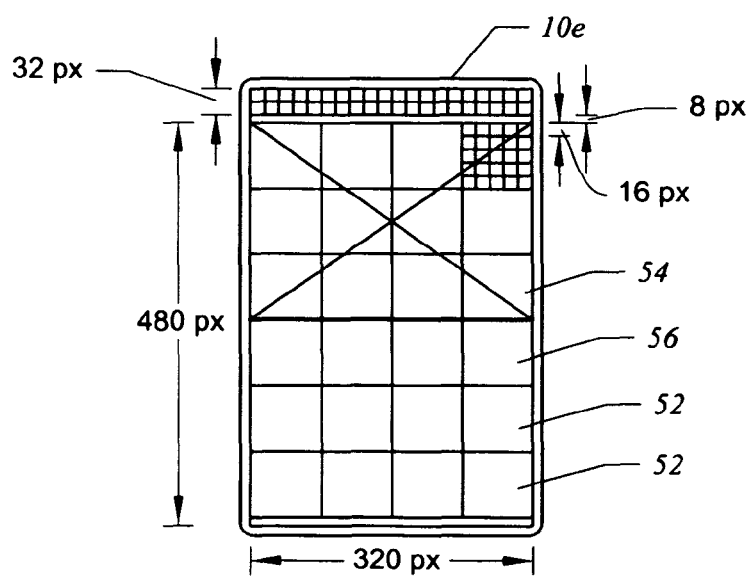
*FIG. 5*

CARD FORMAT FOR DIGITAL SCREEN AND PRINT DISPLAY

RELATED APPLICATIONS

This utility application claims the benefit of provisional application of the same title, Application Ser. No. 61/209,165, filed Mar. 4, 2009.

BACKGROUND OF THE INVENTION

The card metaphor is a timeless medium for exchange of ideas. A card, particularly a physical card, has a limited amount of visual real estate available to convey information. The text must be readable and the graphics must be cognizable, that is, understandable at some common level. These constraints provide challenges when used as a medium to convey information.

Technology convergence has spawned some convenient offspring that become de facto standards. The credit card and the business card have merged to the dominant format. The longer but narrower business card suffered physical degradation when mashed in a wallet with the shorter but wider credit card. Frayed corners became rounded. The elongated rounded corner business card adopted by some in response was a stopgap measure. The dominant format of the sturdy plastic credit card won that format duel. Business cards are migrating to thin plastic wallet cards, sized to the credit card. The standard "wallet card" is common not only to credit and debit cards, but plastic and paper transportation cards, gift cards, phone cards and coupon cards.

On a parallel front, the current optimum screen for handheld communication devices, particularly those with internet capabilities, has first temporarily settled on a card-size screen with 480 pixel by 320 pixel granularity. The size and granularity of this screen allows for media presentations acceptable to modern content providers, including motion pictures and interactive games. The popularity of the Apple iPhone has established the card-size 480 pixel by 320 pixel screen as a format standard. The 3×2 ratio of the screen, however, has never really been a favored configuration for cards, including playing cards, trading cards, business cards, or ordinary index cards. Nevertheless, the metaphor of the card aptly applies to the exchangeability of the content capacity of the handheld electronic screen and the physical printed card.

On the other hand, subsequent multi-media communication devices emulating the iPhone have higher resolution screens. For example, the Android Nexus has a screen with an 800 pixel×480 pixel resolution providing a familiar 3×5 aspect ratio. The leaner resulting content image when converted to the ISO card format does not provide an extra area for a header or trailer, but rather an increased side margin that permits a side bar of about 22 pixels running the entire 800 pixel length of the content field.

The preferred method of converting the screen image to a card image with a visible or hidden header, trailer or side bar, is by an application or applet in the handheld device that is programmed to accomplish the conversion, allow the additional coding or data to be input into the extra field, and direct the printing of the card to a conventional paper printer. The preferred combination is a dedicated card printer that communicates with the handheld through a Bluetooth wireless communication channel since most modern handheld devices now have this capability.

SUMMARY OF THE INVENTION

It will be discovered that applying the first de facto standard of the electronic handheld screen to the de facto standard of the physical card is an inexact transformation. Given the mismatch of the 1.5 aspect ratio of the screen and the almost 1.6 ratio of the wallet card, the transformation is only a tantalizing approximation. However, this adaptation provides an avenue of opportunity.

Because of its greater aspect ratio, a 3×2 frame centered within the perimeter of a wallet card (to use a generic term for a card having the width and length of an ISO standard credit card) will create greater margins at the ends of the card than at the elongated sides. To approximate in pixels, a wallet card of 320 pixels in width will have a length of approximately 520 pixels. This provides an extra border of approximately 20 pixels at each end, or preferably a 40 pixel banner at one end.

It is to be understood in this transformation that the use of the term "frame" connotes a content window. The content window can be sized the full length and width of the physical wallet card, in which case some content will be lost to the rounded corners, or sized smaller than the physical wallet card, in which case the content will be framed by a uniform border. The border may be demarcated at the edge of the window by a thin line that is either part of the new 320×520 pixel joint content field, or part of a display of the card on printing or depiction on a digital screen of greater pixel size than the pixilated wallet card.

An enlarged content window that provides an extra 40 pixel by 320 pixel frame is advantageous not only when utilized as an informational header or advertising banner on printing a facsimile of the screen content, but may be advantageous as an auxiliary screen for a handheld device. In this manner the entity in control of the extra pixel band may utilize the band for content control of the formatted media displayed in the "standard" frame derived from the first de facto standard display screen. This suggests, modification to the handheld hardware to add at least one narrow elongated display for advantageous display of separately controlled information such as quality of service or other performance metrics or simply service provider banner ads. Juxtaposition of the added display to the primary standard content display is desired to maintain the continuity of the header frame to the content frame of the combined electronic displays to the header and content parts of the printed card. This control point allows input from an entity other than the content provider of the primary display.

It is also to be understood that the traditional detail of the ordinary printed card is far in excess of the electronically displayed card. Therefore, it is desirable that the pixel density of the printed card substantially exceed the pixel density of the electronically displayed card. The popular handheld displays of the 480×320 pixel category currently display at around 160 pixels per inch. This is more than adequate for a casual electronic display medium, but overly granular for a printed medium of similar size. Even lower resolution dot matrix printers have a comfortable 300 dpi (dots per inch) printing capability. Typically, in a system utilizing the teachings of this invention or discovery, picture files for wallet cards should preferably have a pixel count at least four times the count of the files for the corresponding electronic display cards. In this manner, display of the graphic for a 520 pixel× 320 pixel card on a higher resolution monitor allowing expanded fields will display a 1040×640 pixel image with acceptable granularity for printing on the reduced dimension physical card.

The second de facto "standard" for a handheld display of the type marketed as the iPhone or iTouch is the Android. Nexus that has a display screen of 800 pixels X 480 pixels. This provides a 3×5 aspect ratio. In this instance, the content frame when adapted to the standard credit card is a little narrower than the physical card. In landscape mode an extra top and bottom border of 11 pixels×800 pixels is left. When the top and bottom borders are consolidated as a single header or trailer in the landscape mode, a 22×800 pixel area is available for data or graphic symbols as previously noted. Again the header or trailer can be utilized in a variety of ways i.e. for advertising, screen control buttons, codes or other means. Of course, instead of using the extra real estate for a header or trailer, when in the portrait orientation, the 22×800 pixel area can provide a side strip for entry of information or data.

Examples of the wallet card are described in the detailed description of the preferred embodiments. While the primary use of the wallet card is the traditional business card, the wallet card may similarly function as a secure identity card or encrypted access card to other real or virtual systems. The principal focus of this display print transformation is not the internals of a smart card or powered card with higher levels of security implementations, such as one time pin codes, biometric authentication sensors or other sophisticated electronic systems, but rather the visual skin or surface of the card that allows the card to be fabricated of paper stock, or thin-film polymer stock having a rich card feel with wear resistant properties without compromising the message to be conveyed. The information to be imparted and the data to be transferred is evident from visual inspection of the card. This in turn allows machine reading of the card and transformation of the expressed data or information to digital format for processing by a digital processor such as a personal computer.

BRIEF DESCRIPTION OF THE DRAWINGS

FIG. 3 is a depiction of the layout of the wallet card with a header field and a content field.

FIG. 4 is a depiction of the layout of the wallet card with the header field and content field combined.

FIG. 5 is a depiction of the matrix structure of the wallet card.

FIG. 7 is an alternate embodiment of a wallet card in landscape mode utilizing a 480 pixel×800 pixel content field and a 22 pixel×800 pixel trailer shown as a matrix structure FIG. 8 is a schematic diagram of the preferred system for converting the wallet card from a digital display image to a physical printed display card.

DETAILED DESCRIPTION OF THE PREFERRED EMBODIMENTS

The wallet card 10 is an electronic or printed display card that is derived from the screen of modern handheld electronic display devices and a physical card having ISO surface dimensions. The wallet card 10 has a first embodiment 10a in FIG. 1 as an identity card, and a second embodiment 10b in FIG. 2 as an information card (info card).

Figure 1:
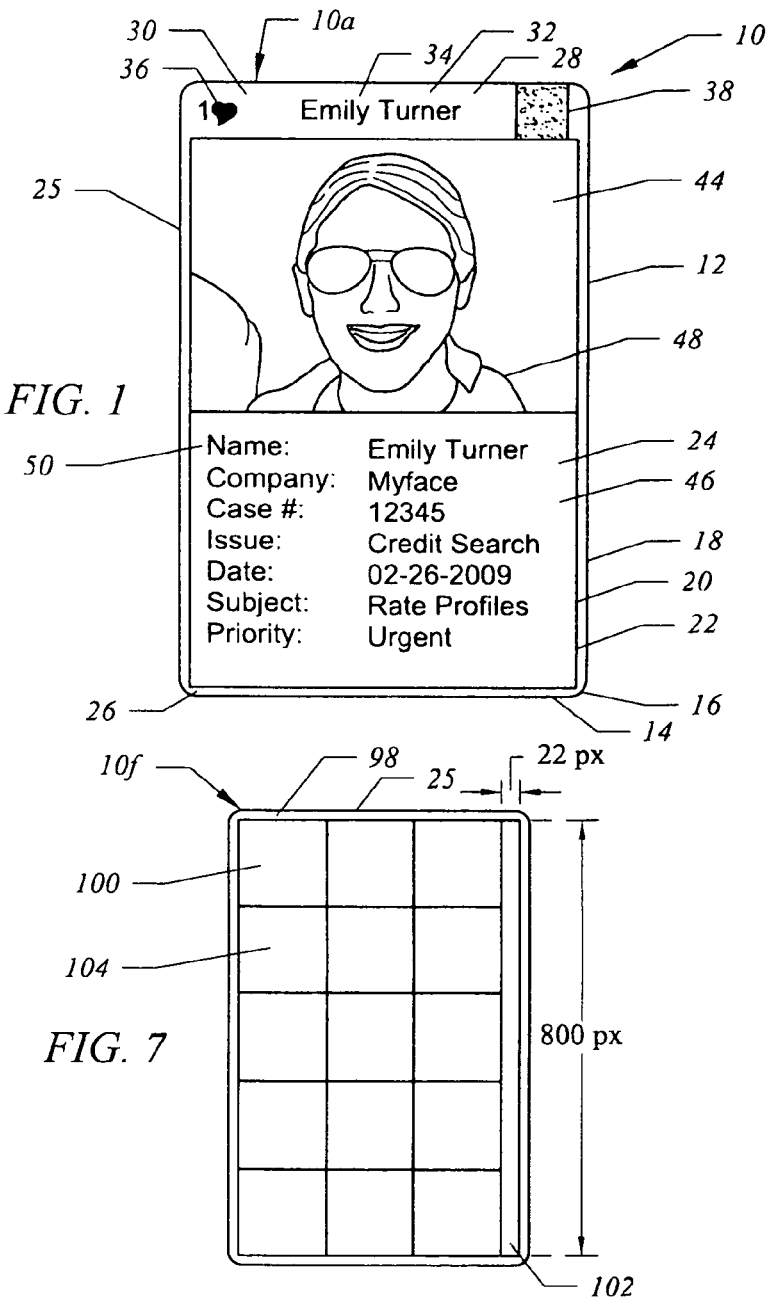
FIG. 1 is a first embodiment of the wallet card of this invention in the format of an identity card.

Referring first to FIG. 1, the illustrated wallet card 10a is configured to substantially conform to the ISO size of a conventional banking card such as a credit or debit card. The ISO card has dimensions of 2.125 inches by 3.370 inches or 53.98 mm×8.55 mm. Of course there is no thickness requirement for the wallet card and it can be made from paper stock or a polymer for added durability. The card can be printed or displayed on two sides, but the usual case for convenient reference is similar to a playing card and informatively printed on one side with the other side left blank or printed and displayed with a generic pattern for a collected class of wallet cards.

In the embodiment of FIG. 1, the wallet card 10a is in the form of an identification card for a person with a number of text and graphic entries. Because the layout of the identification card may be varied, and alternately oriented in landscape mode and not simply in portrait mode as shown, only a basic arrangement is illustrated which provides a general utility for a variety of purposes. For example, the card 10a may be used as a serious identity card or simply a passable token for a social network that has fields relating to a person's astrological sign, favorite actor or music preference and the like.

The structure of the card is similar to a playing card with elongated sides 12 and narrow sides 14 with rounded corners 16. The card 10a is shown with an outline 18 that may be omitted when printed, and a line 20 forming a content frame 22 that circumscribes a content field 24 of 320×480 pixels. The content frame 22 is preferably arranged within the outer perimeter 25 of the card and marginally displaced from the rounded corners 16 of the card 10a.

When the layout for the content field 24 is sized to fit within the perimeter of the card 10a, with uniform margins 26 on the sides and bottom of the card 10a, an enlarged margin 28 remains at the top of the card 10a. This margin 28 provides an extra header field 30 that may function as a banner 32 for the content field 24. This header field 30 is shown without a frame line, but corresponds in width to the 320 pixels of the content field 24. The header field 30 has a pixel height of approximately 40 pixels. It is to be understood that the two layout fields 24 and 30 when combined may optionally be enlarged to bleed over the perimeter 24 with some loss of content, typically for artistic reasons.

Although alternately, a 20 pixel header and 20 pixel trailer (or footer) may be provided, the double size header is most useful. The header field 30 may include redundant information, such as the name 34 of the person identified by the card or unique information, such as the playing card symbol shown that can provide a class and value marker 36 to the content of the card. Added to this embodiment is a 2D bar code 38 that provides a machine-readable public key to a security or authentication system. Other security markers can be added according to the requirements of the application. The header field 30 can be colored to provide a color-coded banner 32. The relationship between the content field 24 and the banner or header field 30 is shown in FIG. 3 with the card 10c divided into the header field 30 and the content field 24 with a substantially uniform perimeter border 40 of approximately 4 additional pixels. The combined field 42 of 320×520 pixels is shown in the card 10d of FIG. 4 with the border 40 having an outline 43 of the wallet card perimeter.

The content field 24 of the wallet card 10a of FIG. 1 is divided into a graphics area 44 and a text area 46. The graphics area 44 is typically filled with a graphic such as a photo 48. The text area 46 is typically filled with text fields 50 such as the listed fields of name, company, case no., etc., which can be the subject of a database for organizing field information.

The format of the wallet card 10a for the identity card embodiment of FIG. 1 follows a uniform division of the card as shown in the matrix configuration of the card 10e shown in FIG. 5. Notably, a 320×480 pixel content field 24 lends itself to a 4×6 set of cells 52 that are each 80 pixels square, and a uniform 4×3 cell composite for upper and lower sectors 54 and 56 corresponding to the graphics area 44 and text area 46 described above. The 4×6 cell set is convenient for locating icons or thumbnails for information composites or mosaics as taught in previous patents of this inventor.

Figure 2:
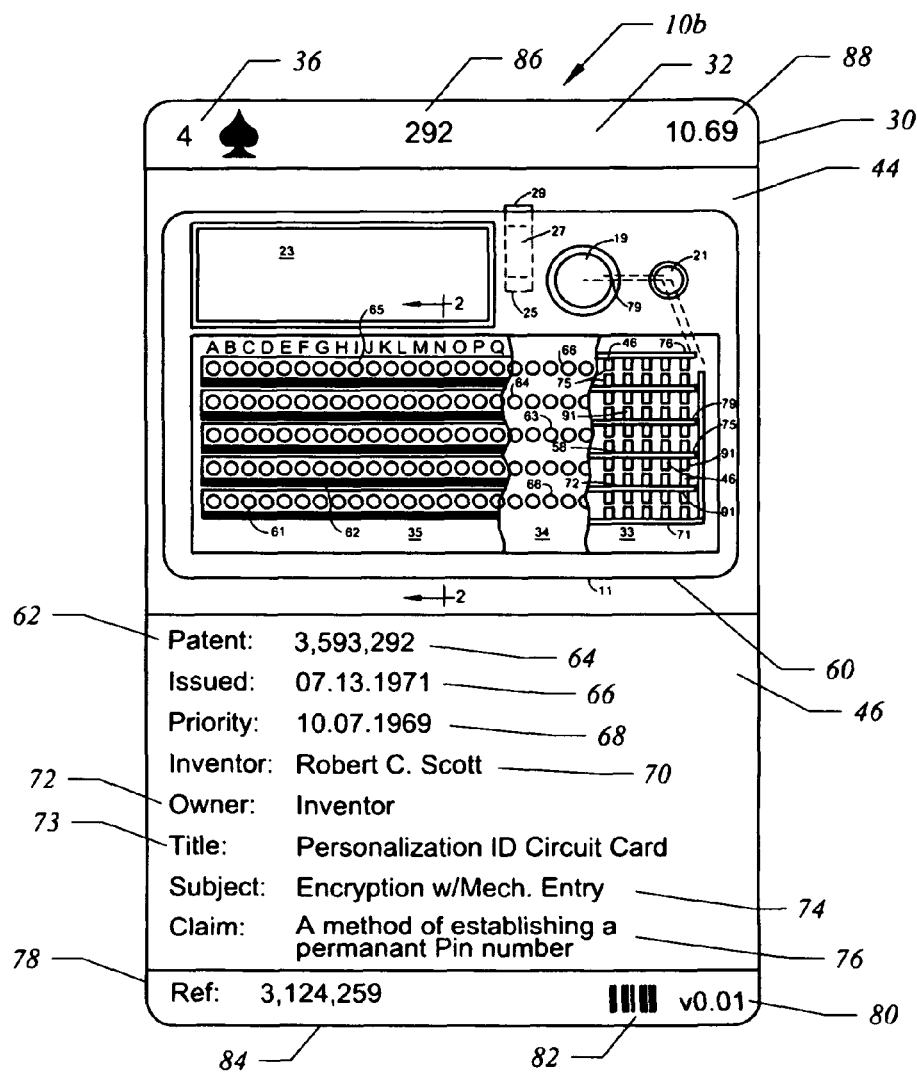
FIG. 2 is a second embodiment of the wallet card in the format of an informational card.

The layout of the wallet card 10 in the embodiment of an info card 10b is shown in FIG. 2. The info card 10b is in the format of an abbreviated informational card for a patent. In this form some of the basic information about an issued or published patent can be displayed on a card sized to the de facto credit card standard described.

Additionally, in portrait orientation as shown, the adopted value sign marker 36 can be maintained in the left part 58 of the header field 30 in both embodiments, so the cards can be fanned in the manner of common playing card for a quick preview. The grouped cards may be part of a patent portfolio, that is, a stack of patent cards usually having some topical relationship, or person cards from a group of friends, or a collection of info cards having no particular relationship at all.

The general division of the wallet card 10b into a header field 30 in the form of a banner 32, with the content field 24 divided into a graphic area 44 and a text area 46, is maintained. It is understood that other layouts are contemplated that are typically correlated to the content set of a related series of cards in a group. In the patent card embodiment, the graphic area 44 has a selected drawing figure image 60 from the identified patent. Since this system is user oriented, the selected drawing figure image 60 need not be the drawing image that the patent office selects for the cover page of an issued or published patent. The image may be cropped and sized to conform to the space allotted.

The text area 46 has a list of typical data fields 62 that are useful in understanding the identity of the patent 64, the date of issue 66, the earliest priority date 68, the inventor 70, the owner 72, a rephrased title 73, general subject 74, a synopsis of the claim (given two lines) 76, and a reference to one or more related art references 78. A version number 80 may refer to the version of the particular card modification, or, the version of a software program that can interpret and produce the card or cards. Additional data or code can of course be included such as a barcode 82 at the bottom 84 of the wallet card 10b. The data fields 62 may allow for a limited number of characters to be input to permit all of the input data or information to be printed on the limited size physical card while maintaining readability.

Figure 6:
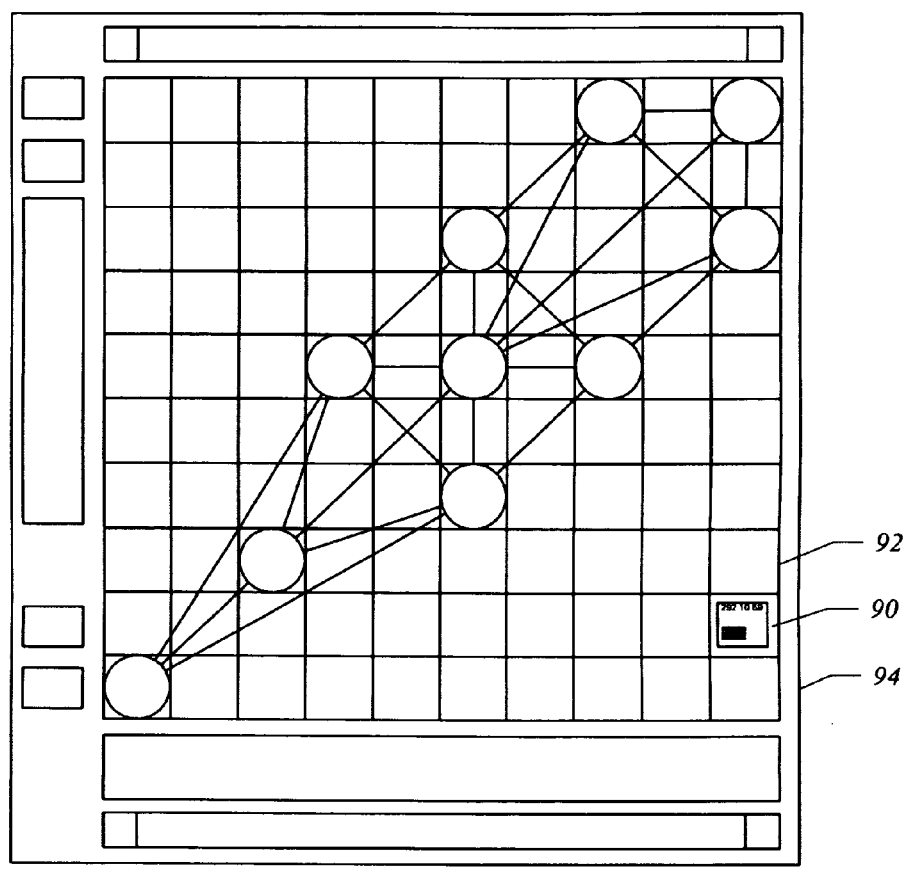
FIG. 6 is a depiction of a wallet card reduced to an icon and displayed in an info map.

In the header field 30, in addition to the value marker 36, are an abbreviated patent number 86, typically used as a short hand ID of a particular patent, and an abbreviated date 88, which may out of preference be the month and year of the priority date of the patent. The data entries are enlarged such that when the header field 30 is combined with the graphic area 44 of the content field, and reduced to a thumb nail or icon 90, at least the text identity of the icon 90 is recognizable when the electronic capture and display is presented, for example, in the cell matrix 92 of an info map 94 of a standard size screen as shown in FIG. 6. Typically, an info map 94 would have a plurality of different icons distributed in some logical pattern or grouping as previously described in prior patents of this inventor.

The wallet card 10 is adapted to utilize the screen specifications for other handheld devices, for example, the higher resolution Android Nexus that has an elongated screen of 800 pixels×480 pixels. When adapting this screen specification to the standard credit card format as shown in FIG. 7 with uniform margins 98 within the standard card perimeter 25, the content field 100 leaves a narrow side bar 102 of approximately 22 pixels×800 pixels along one edge (here, arbitrarily the right edge) of the vertically-oriented, alternate embodiment wallet card 10f. Again this side bar 102, which is in addition to the full-screen content field 100, is designed to be utilized for features previously discussed. In the matrix configuration illustrated, the wallet card 10a is divided into uniform cells 104 of 160×160 pixels in a 3×5 cell arrangement, or further broken down into comparative 80 pixel square cells in a 6×10 matrix for convenient division of the content field as previously described. Although the side bar 102 may not be as desirable as a header for many purposes, there are 17,600 pixels available for coding compared to 12,800 pixels for the 320×480 pixel screen.

The implementation of the wallet card 10 can be accomplished by the construction of a report or form feature of a database program. Organization and transfer of the data stream enabling the construction of a display card that is either shown electronically or printed in the manner described can be accomplished by utilizing a cross platform standard such as vCard, the Electronic Business Card. For example, the Version 2.1 specification of Sep. 18, 1996 for the vCard can be used to program the data fields and graphic fields using the supported properties. In such implementation requiring at least a name field and a version field with optional additional standard fields, the described wallet card can be constructed and deconstructed using the protocols accompanying the interchange format of the vCard Object.

The identification card 10a is a natural fit for the "business card" implementation of the wallet card 10. However, the info card 10b implementation may require a bit more imagination. The "name" property of a vCard by definition of the specification can be the name of a person, place or thing. Thus, Patent No. 3,593,292 or Scott '292 could serve as the name or supported "N" property. The other mandatory property "VERSION" would likely be hidden, that is, not shown on a printed or electronic display of the wallet card 10.

In adapting spec fields to the information shown on the wallet card 10, "PHOTO" would include the graphic depiction of the selected patent drawing figure image 60. The value marker 36 can either be constructed from a text-based Unicode dingbat or utilize the "LOGO" property in the vCard spec. This provides for a graphic depiction having the format options that are similar to the "PHOTO" property.

Where the wallet card 10 includes a 2D barcode, for example a DataMatrix type of symbol, the "LOGO" property is preferably reserved for the barcode when presented as a graphic. The data field for date of patent issue can adopt the "BDAY" property, the priority date field can adopt the "LABEL" property, since the header field 30 (the card label) includes an abbreviated "label" date for priority that can be derived from the priority date. The inventor field can logically adopt the Formatted Name ("FN") property. Additionally, the owner field can adopt the "ORG" property, the title field can adopt the "TITLE" property, the subject field can adopt the "ROLE" property, and the claim field can adopt the comment or "NOTE" property. The reference field can adopt one of the remaining properties such as the address or "ADR" property. The version field, which is the particular card revision and not the hidden reference to the vCard version, can adopt the "REV" property which is translated by a tailored vCard Writer from a date to a version number.

The thumbnail or icon 90 can be a nested vCard object that is incorporated within the primary vCard object by the "AGENT" property and may be a nested PHOTO or LOGO with appropriate identification such as a modified name and advantageously an optional globally unique identifier ("UID") that is hidden on electronic display or print display. Similarly, the parent vCard can optionally include a variety of other vCard specification properties that are appropriate to the application or card group, including grouping, security features or other standard or extension properties tied to the selected virtual card specification. The suggested assignments are appropriate for implementation of a reasonably logical card system using a readily available cross platform specification. Other assignments for the patent card shown may make more sense than those described as an example.

It is to be understood that other systems can be utilized and that individual cards can in their entirety be in the format of a graphic image. However, the use of a Report or Form feature of a system that allows user entry of data and graphics in the fixed fields of a particular wallet card allow users to create cards through a web applet. The unique header field 30 provides an opportunity for an informational banner that can be used for advertising, identity management or any of a variety of different applications that can adapt to this newly discovered space when transforming a truncated screen card to a printed card adopting the de facto card size.

In the preferred and most direct system, the mobile handheld device 106 as shown in FIG. 8 has an internal applet that includes programming for viewing not only the content field, but the header or side bar fields collectively the coding fields. In this manner the virtual wallet card can be generated with the installed applet and transmitted over the airways, using Bluetooth, to a card printer 108 having a magazine of blank or partially printed cards 110. The program protocol alerts the printer 108, transmits the data and coding necessary to activate the printer and print the physical wallet card 112, which is deposited on a printer tray 114 for pickup.

The invention claimed is:

1. A method for printing a full-screen content of a screen display of a handheld mobile multi-media device on an ISO standard card typically used for credit cards and debit cards where the aspect ratio of the screen display of the handheld device does not match the aspect ratio of the ISO standard card and adding data, graphics, coding or other information for printing on the ISO standard card with the full-screen content comprising the steps of:

comparing the aspect ratio of the screen display of the handheld device with the aspect ratio of the ISO standard card;

determining a first area of the ISO standard card that accommodates the screen display at the aspect ratio of the screen display;

generating the full-screen content in the screen display;

sizing the full-screen content of the screen display to fit in the first area of the ISO standard card at the aspect ratio of the screen display;

determining a second area of the ISO standard card that remains within a uniform margin of the ISO standard card after accommodating the full-screen content of the screen display;

adding the data graphics, coding or other information sized to be printed in the second area of the ISO standard card; and, printing the ISO standard card with the full-screen content of the screen display in the first area of the ISO standard card and with the added data, graphics, coding or other information in the second area of the ISO standard card, wherein the steps before printing the ISO standard card are performed by an internal applet in the handheld device and the internal applet has a program protocol that alerts a printer and prints a physical wallet card.

2. The method of claim 1 wherein the internal applet in the handheld device includes programming for viewing not only the full-screen content, but also the added data, graphics, coding or other information to be printed on the physical wallet card.

3. The method of claim 2 wherein the internal applet has programming for transmitting the program protocol over the airways to the printer for printing the physical wallet card.

* * * * *